United States Patent
Levi et al.

(10) Patent No.: US 7,559,273 B2
(45) Date of Patent: Jul. 14, 2009

(54) SUBSTANCE-EXTRACTION DEVICE AND MACHINE FOR PRODUCING DRINKS

(75) Inventors: Jean-Pierre Levi, Nice (FR); Mario Levi, Nice (FR)

(73) Assignee: Unic S.A.S., Carros (FR)

( * ) Notice: Subject to any disclaimer, the term of this patent is extended or adjusted under 35 U.S.C. 154(b) by 667 days.

(21) Appl. No.: 10/542,347

(22) PCT Filed: Dec. 17, 2003

(86) PCT No.: PCT/FR03/50185

§ 371 (c)(1),
(2), (4) Date: Dec. 9, 2005

(87) PCT Pub. No.: WO2004/064583

PCT Pub. Date: Aug. 5, 2004

(65) Prior Publication Data

US 2006/0144243 A1 Jul. 6, 2006

(30) Foreign Application Priority Data

Jan. 15, 2003 (FR) .................................. 03 50003

(51) Int. Cl.
*A47J 31/06* (2006.01)
*A47J 31/40* (2006.01)

(52) U.S. Cl. .......................... 99/291; 99/295; 99/302 R

(58) Field of Classification Search ............ 99/291, 99/283, 295, 302 P, 302 R, 289 T
See application file for complete search history.

(56) References Cited

U.S. PATENT DOCUMENTS

| 3,356,011 A * | 12/1967 | Parraga ................ 99/289 R |
| 5,520,093 A * | 5/1996 | Ackermann ............ 99/289 T |
| 6,619,188 B1 * | 9/2003 | Meador .................... 99/295 |
| 2002/0002913 A1 | 1/2002 | Yoakim et al. |
| 2003/0066431 A1 * | 4/2003 | Fanzutti et al. ............ 99/279 |

FOREIGN PATENT DOCUMENTS

| FR | 534 031 | 3/1922 |
| FR | 547 071 | 11/1922 |

* cited by examiner

*Primary Examiner*—Reginald L Alexander
(74) *Attorney, Agent, or Firm*—Young & Thompson

(57) ABSTRACT

A device used to extract a substance in order to produce drinks, includes a plurality of brewing chambers (7, 8). The device has an interface (6) which is used to connect to a hot water supply inlet and element for distributing the hot water between the brewing chambers (7, 8) containing a substance that is to be infused. For each brewing chamber (7, 8), the aforementioned distribution elements include elements for detecting the presence of the substance to be infused and elements for opening the hot water inlet into the brewing chamber (7, 8) upon detection of the substance. A machine including such a device is also disclosed. The invention is particularly suitable for making espresso coffee.

10 Claims, 10 Drawing Sheets

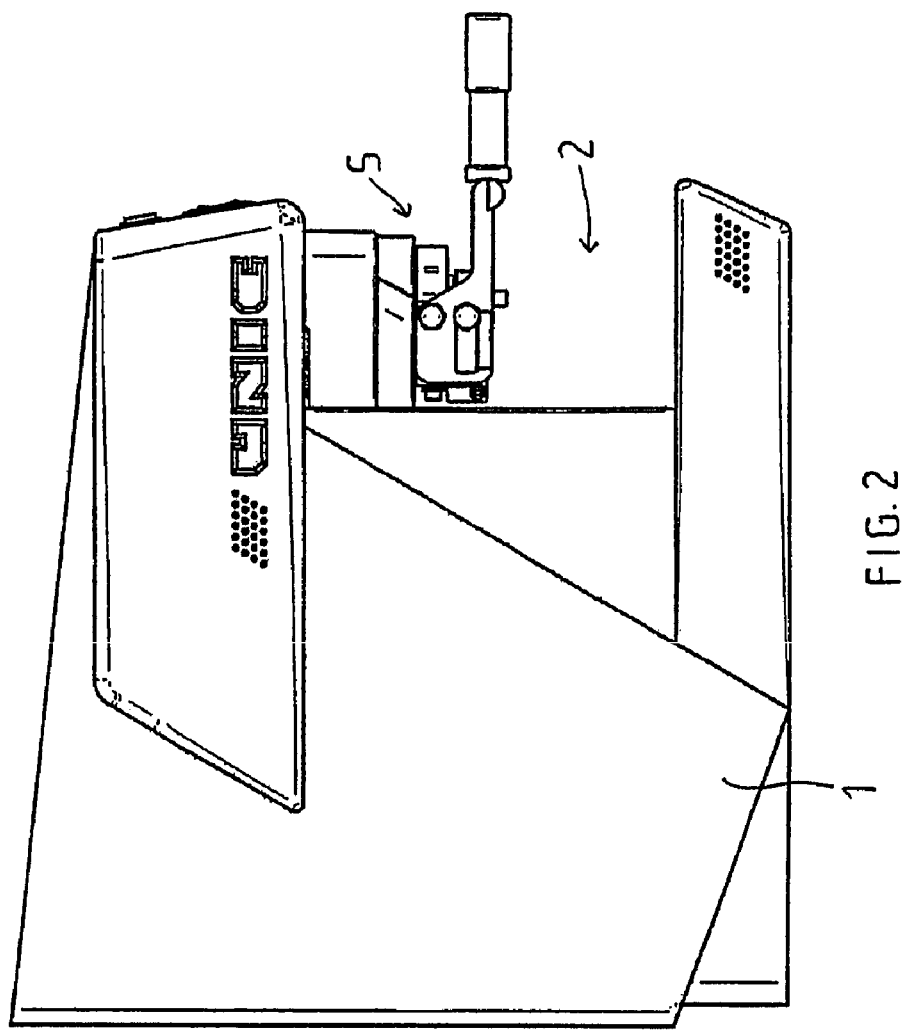
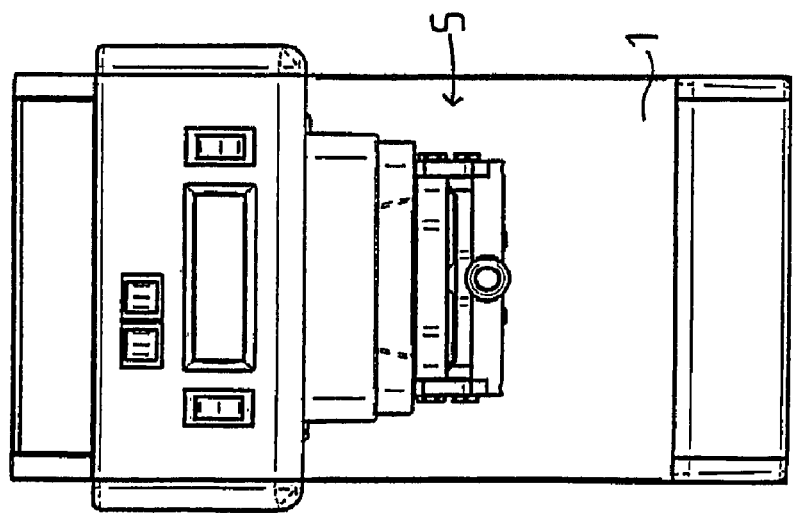
FIG. 2
FIG. 1

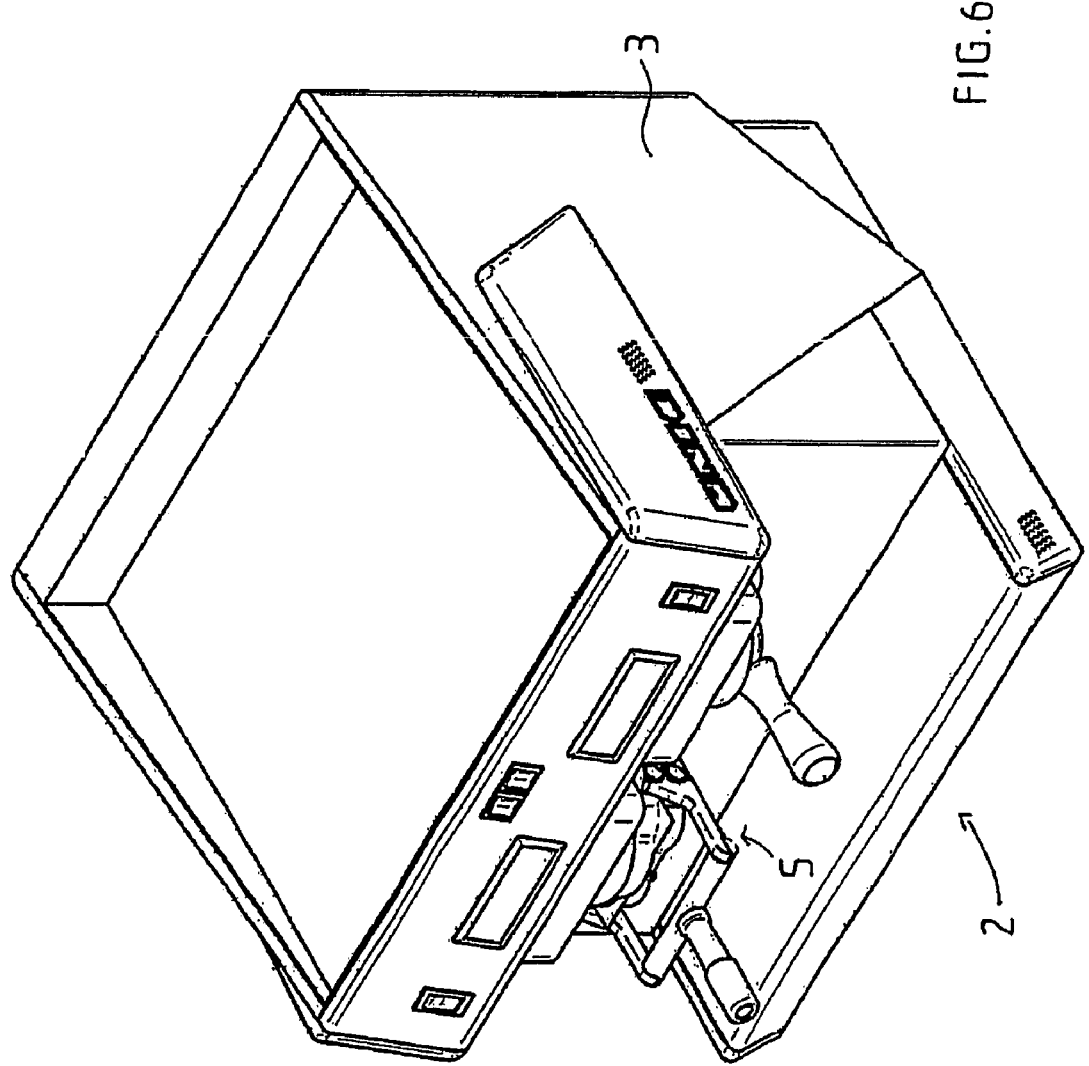

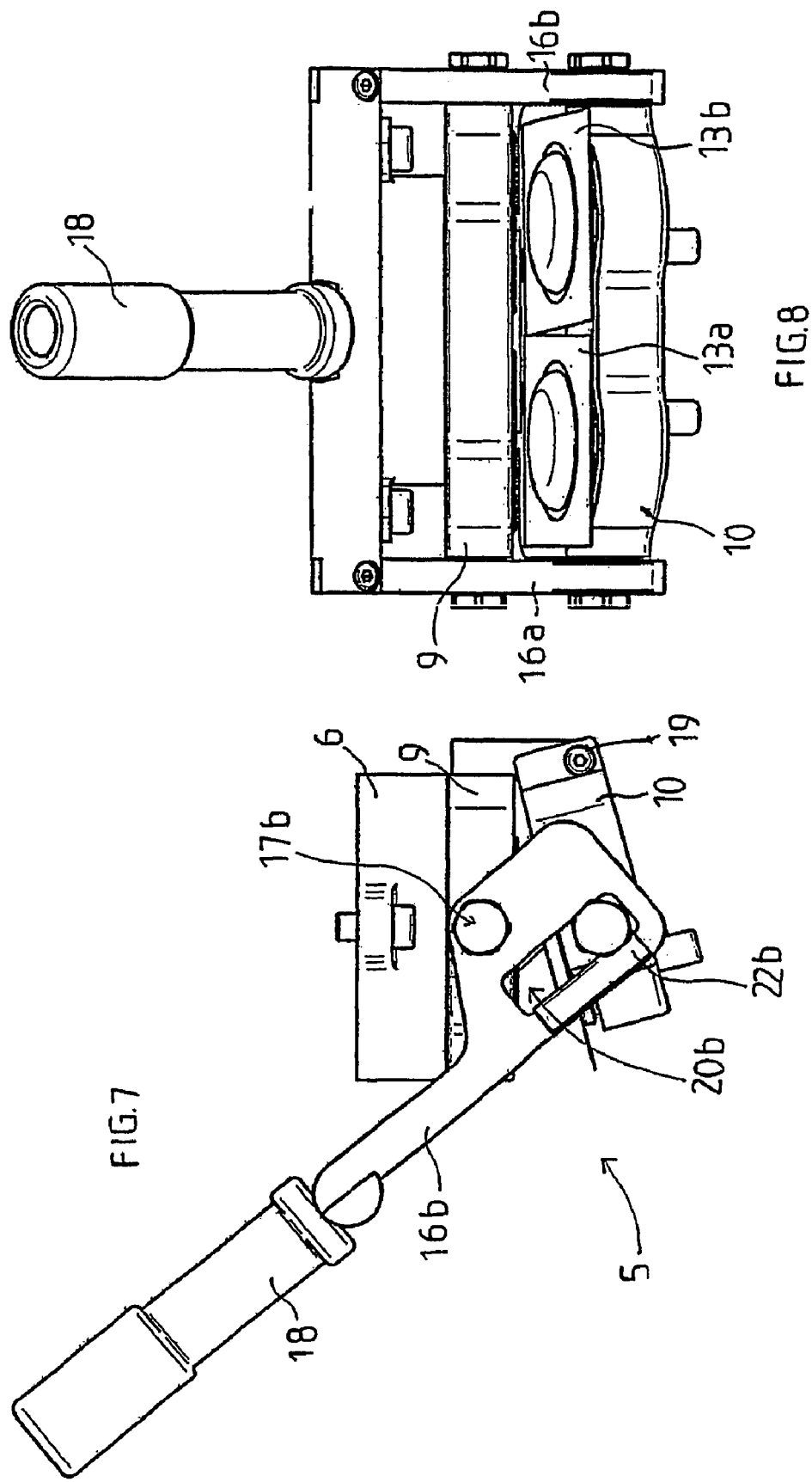

SUBSTANCE-EXTRACTION DEVICE AND MACHINE FOR PRODUCING DRINKS

BACKGROUND OF THE INVENTION

The invention relates to a device which is used to extract a substance in order to produce drinks comprising a plurality of brewing chambers.

It also relates to a machine incorporating the device according to the invention.

The invention is particularly suitable for producing drinks of the espresso coffee type, produced by pressurized hot water infusion of ground coffee.

More precisely, the invention may be applied to coffee machines able to use packages of the substance to be infused (ground coffee in particular) in the form of sachets made of filter paper.

DESCRIPTION OF THE RELATED ART

The variety of consumer demands (coffees of various origins, decaffeinated coffee, etc) as well as concerns for productivity have led manufacturers of coffee machines to propose machines for producing a plurality of espresso coffees.

In this connection, Document EP-A-1 219 216 describes an automatic device for extracting a substance such as ground coffee, with, according to a particular embodiment, two brewing chambers which are parallel and supplied directly by two hot water supply lines.

Such a machine allows the simultaneous production of several drinks, but involves a multiplication of the means required for this purpose, according to the number of brewing chambers made. In particular, the electric controls and the hot water supply circuits must be multiplied to take account of the number of brewing chambers.

Furthermore, according to this prior art, the multiplication of the number of brewing chambers entails a general adaptation of the coffee machine calling into question its entire design and manufacture.

SUMMARY OF THE INVENTION

The invention constitutes significant technical progress with regard to the known prior art in the area concerned.

A first aim of the invention is to propose a device used to extract a substance making it possible to operate selectively or simultaneously a plurality of brewing chambers on the basis of a machine not initially comprising specific means for controlling supply to each brewing chamber, nor a separate supply circuit for each of the brewing chambers.

One advantage of this configuration of the invention is that it allows it to be adapted onto existing machines, at the pressurized hot water outlet of a conventional coffee machine.

The invention can therefore be embodied in relation to an existing machine by means of a connection interface and makes it possible, by connecting to a single source supplying hot water to the machine, to produce several drinks.

Another aim of the invention is to ensure the simultaneous or selective operation of the plurality of the brewing chambers without the need for additional control means for opening or closing the hot water inlet pipes in each brewing chamber.

In particular, by using the device of the invention, it is not necessary to add electromechanical systems of valves connected to control means on the front panel of the machine for operation by the user. The closing or opening of the hot water inlet circuits in each of the brewing chambers actually takes place automatically.

Consequently, by this invention, a device is manufactured that can be adapted to a coffee machine of standard design (and in particular designed to operate with a single brewing chamber per pressurized hot water supply source) without requiring changes to the body of the machine or to its control means.

Other aims and advantages of the invention will appear in the following description of a preferred embodiment which is however not restrictive.

The invention relates to a device which is used to extract a substance in order to produce drinks, comprising a plurality of brewing chambers, characterized in that It comprises an interface used to connect to a hot water supply inlet and means for distributing said hot water between the brewing chambers containing a substance to be infused.

According to the preferred embodiments this extraction device is such that:

For each brewing chamber, the distributing means comprise means for detecting the presence of a substance to be infused and means for opening the hot water inlet into the brewing chamber upon detection of the presence of the substance to be infused, It comprises, for each brewing chamber, a mobile member between:
  a hot water inlet shutoff position in which one end of the mobile member is deployed inside the brewing chamber,
  a hot water inlet open position in which said end of the mobile member is retracted from the brewing chamber by bearing on the substance to be infused, The brewing chambers are formed in part in a fixed component and in part in a mobile component between an open position and a closed position of the brewing chambers, The fixed component and the mobile component are connected by swivel pin, The mobile component is actuated by a lever mounted by pin on the fixed component and comprising at least one oblong hole cooperating with a guide finger on the mobile component, The guide finger has a rectangular section and is mounted swiveling in relation to the mobile component, At least one portion of the wall of the oblong hole comprises a slip coating, The mobile component comprises, for each brewing chamber a filtering cup supported by a holder of adjustable height inside a housing formed in the mobile component, It comprises two brewing chambers each with a mounted holder adjustable in height inside its housing by a pressure screw serving also to mount a guide finger.

The invention also relates to a machine for producing drinks from a substance to be infused comprising a hot water supply source and comprising a device of the invention.

BRIEF DESCRIPTION OF THE DRAWINGS

The drawings attached are given as examples and are not restrictive of the invention. They represent only one embodiment of the invention and will enable it to be easily understood.

FIGS. 1 to 3 present respectively the front, side and perspective views of a machine for producing drinks of the espresso coffee type according to a first embodiment.

FIGS. 4 to 6 illustrate respectively the side, front and perspective views of a machine for producing drinks of the espresso coffee type in a second embodiment in which a device of the invention is incorporated at the level of a hot water supply outlet pipe, while another hot water supply pipe remains with a conventional filter and filter holder device with a single brewing chamber.

FIGS. 7 and 8 illustrate a particular embodiment of the opening and closing system of the brewing chambers of the device.

DETAILED DESCRIPTION OF THE PREFERRED EMBODIMENTS

The following description describes an embodiment of the invention suitable for the use of packages of a substance to be infused (such as ground coffee) in the form of sachets made of filter paper.

Figure 3:
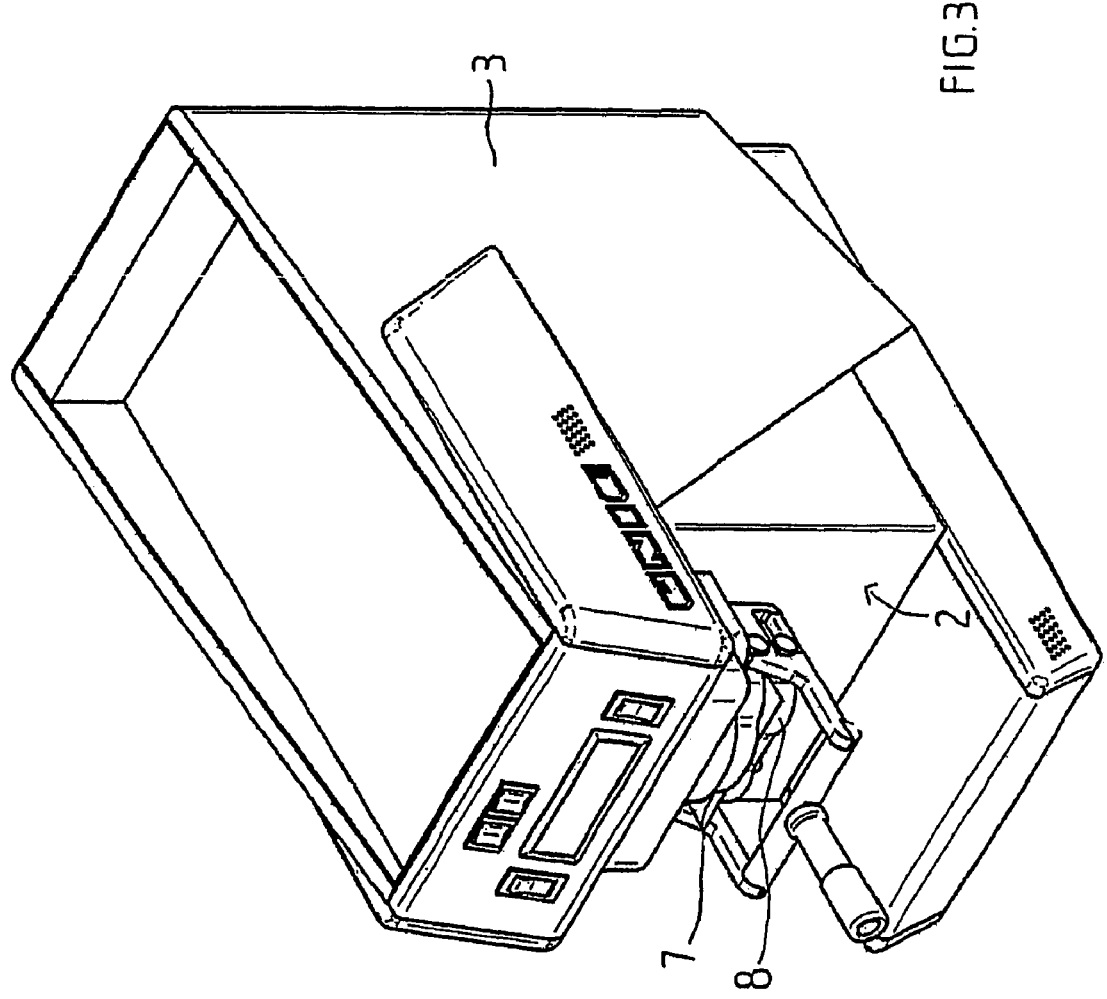

In the case of FIGS. 1 to 3, a device 5 according to the invention is related to a coffee machine 1 of conventional design.

In particular, such a machine comprises a body 3 able to contain the means for producing and pressurizing hot water, as well as the electromechanical means for distributing said hot water.

The coffee machine 1 also comprises conventionally a front panel 2 able to receive various control means in the form of buttons for the functions of startup, and of activation of the pump in particular.

As shown in FIGS. 1 to 3, the device 5 according to the invention can cooperate with a coffee machine 1 of standard design at the existing pressurized hot water outlet pipe to supply continuously a filter and filter holder system able to receive the substance to be infused and constituting the usual single brewing chamber.

FIG. 3 shows in general that it is possible by means of the device 5 of the invention to constitute a plurality of brewing chambers 7, 8, by cooperation with a single hot water supply pipe.

Figure 4:
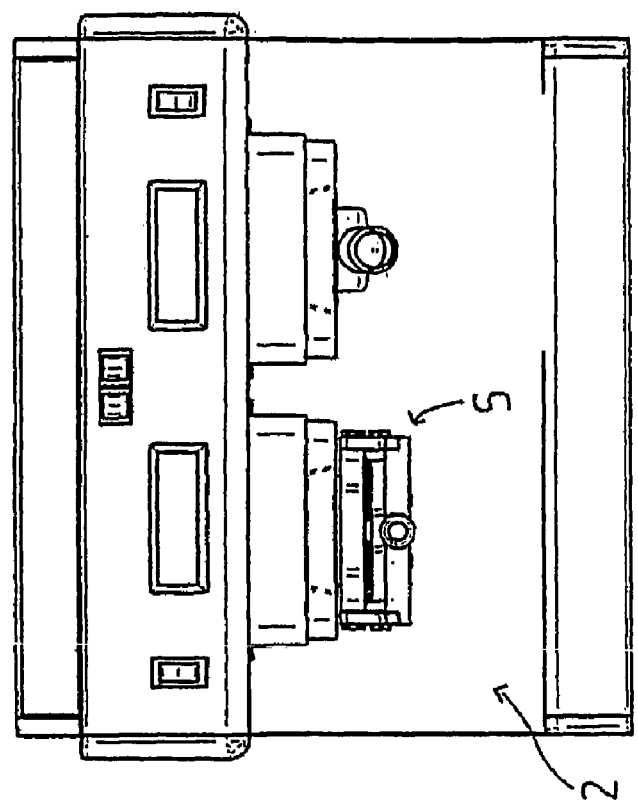
Figure 5:
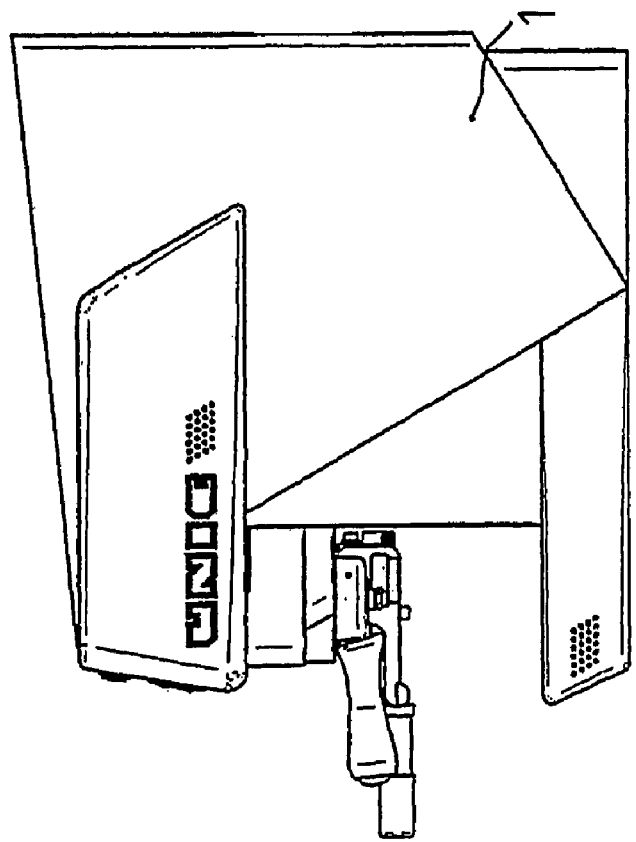

FIGS. 4 to 6 show another example of application of the device of the invention to a coffee machine 1 comprising two hot water outlet pipes usually allowing operation with a single brewing chamber each.

According to the example indicated, a device 5 is installed at one of the hot water supply pipes while a conventional system is retained at the other pipe.

In each case, it will be noted that the remainder of coffee machine 1 and in particular the means for controlling and distributing the hot water circuit have not been altered.

To achieve this result the extraction device 5 according to the invention has the characteristic of comprising an interface 6 used to connect to a hot water supply inlet 4, and means for distributing said hot water between the brewing chambers 7, 8 containing a substance that is to be infused 13a, 13b.

Figure 9:
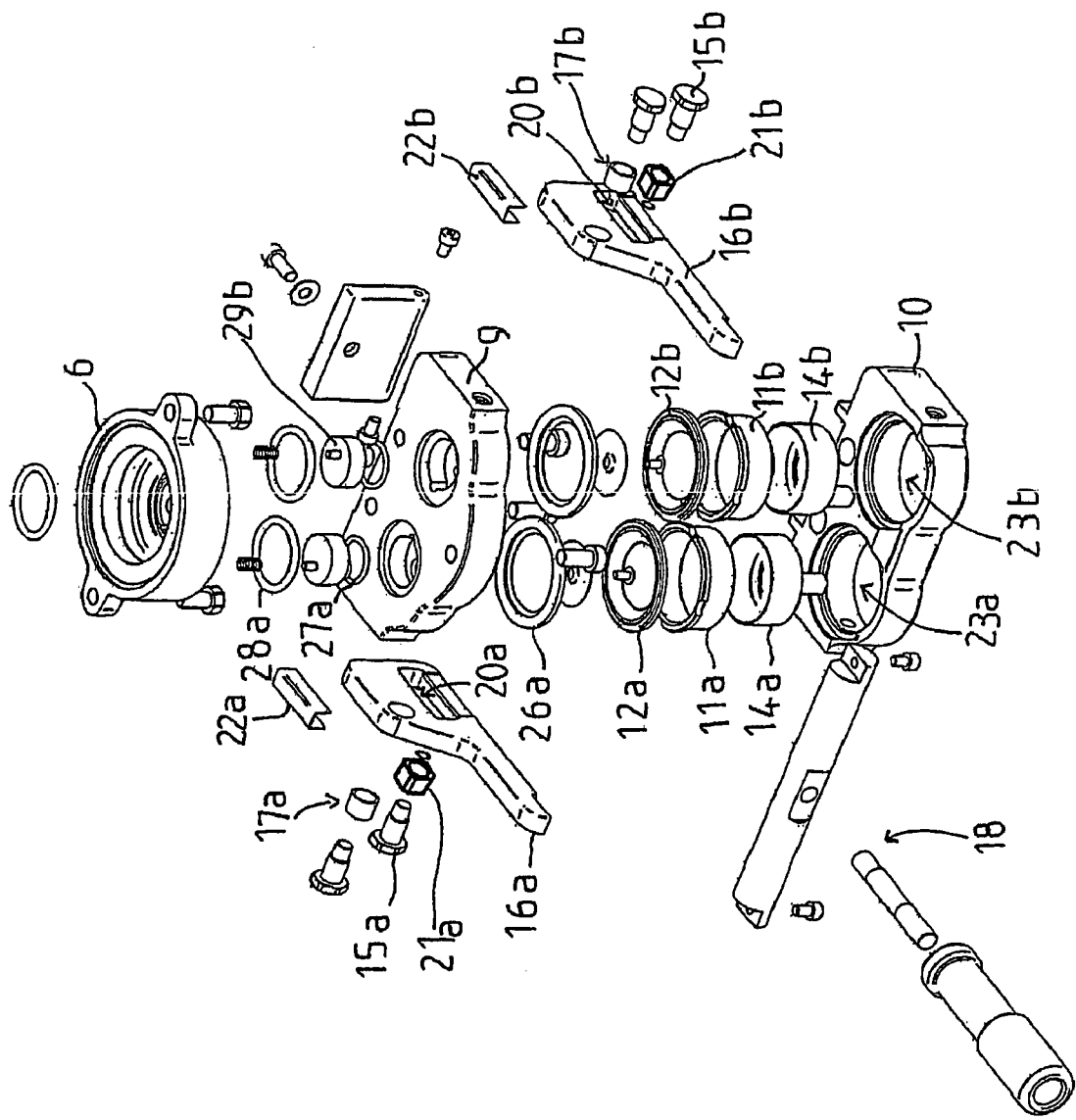
FIG. 9 is an exploded view of the device of the invention.

FIG. 7 shows an example of connection interface 6 as does FIG. 9 which illustrates it in exploded view. In particular, the connection interface 6 may be in the form of a unit comprising a central opening able to be connected to a supply inlet 4 (or supply pipe) of the coffee machine. It is possible in particular to use standard securing means such as screws to secure the interface 6 to the body of coffee machine 1.

Of course, the securing configuration (exterior dimension and positioning of the screws) of the interface 6 will be adapted to the type of coffee machine 1 to which connection is desired.

The extraction device also comprises means of distributing the hot water between the various brewing chambers 7, 8 containing a substance to be infused 13a, 13b.

The examples illustrated in the figures apply to the case in which two brewing chambers 7, 8 are constituted at a device 5. However, this case is not restrictive.

In order to distribute the hot water in the brewing chambers containing the substance to be infused 13a, 13b without fundamental changes to coffee machine 1, device 5 comprises for each brewing chamber 7, 8 means for detecting the presence of the substance to be infused 13a, 13b, and means for opening the hot water inlet into brewing chamber 7, 8 upon detection of the presence of the substance to be infused 13a, 13b.

Thus, automatically, the circuit of hot water inlet into a brewing chamber 7, 8 is opened by the simple pressure of the substance to be infused 13a, 13b.

According to the embodiment illustrated in the figures, and in particular in FIGS. 9 to 14, the detection means and the means of opening the hot water inlet of each brewing chamber 7, 8 consist of a mobile member 29a, 29b.

Advantageously, the mobile member 29a, 29b receives at its bottom end a conventional spout system 24a, 24b able to distribute the incoming hot water on to the substance to be infused 13a, 13b.

In idle position, the mobile member 29a, 29b has a bottom end projecting into the interior volume of the brewing chamber 7, 8.

This idle position is ensured by default by elastic means of standard design, for example by springs 25a, 25b positioned inside a housing in the connection interface 6 making it possible to press the mobile member 29a, 29b on the rim of the hot water inlet into the brewing chamber 7, 8.

To ensure leaktightness in this position, the mobile member 29a, 29b receives a seal 27a, 27b, for example of the O-ring type making it possible, in this configuration, to close the hot water inlet of brewing chamber 7, 8 concerned.

Mobile member 29a, 29b may assume another position able to open the hot water inlet into the brewing chamber 7, 8.

Figure 11:
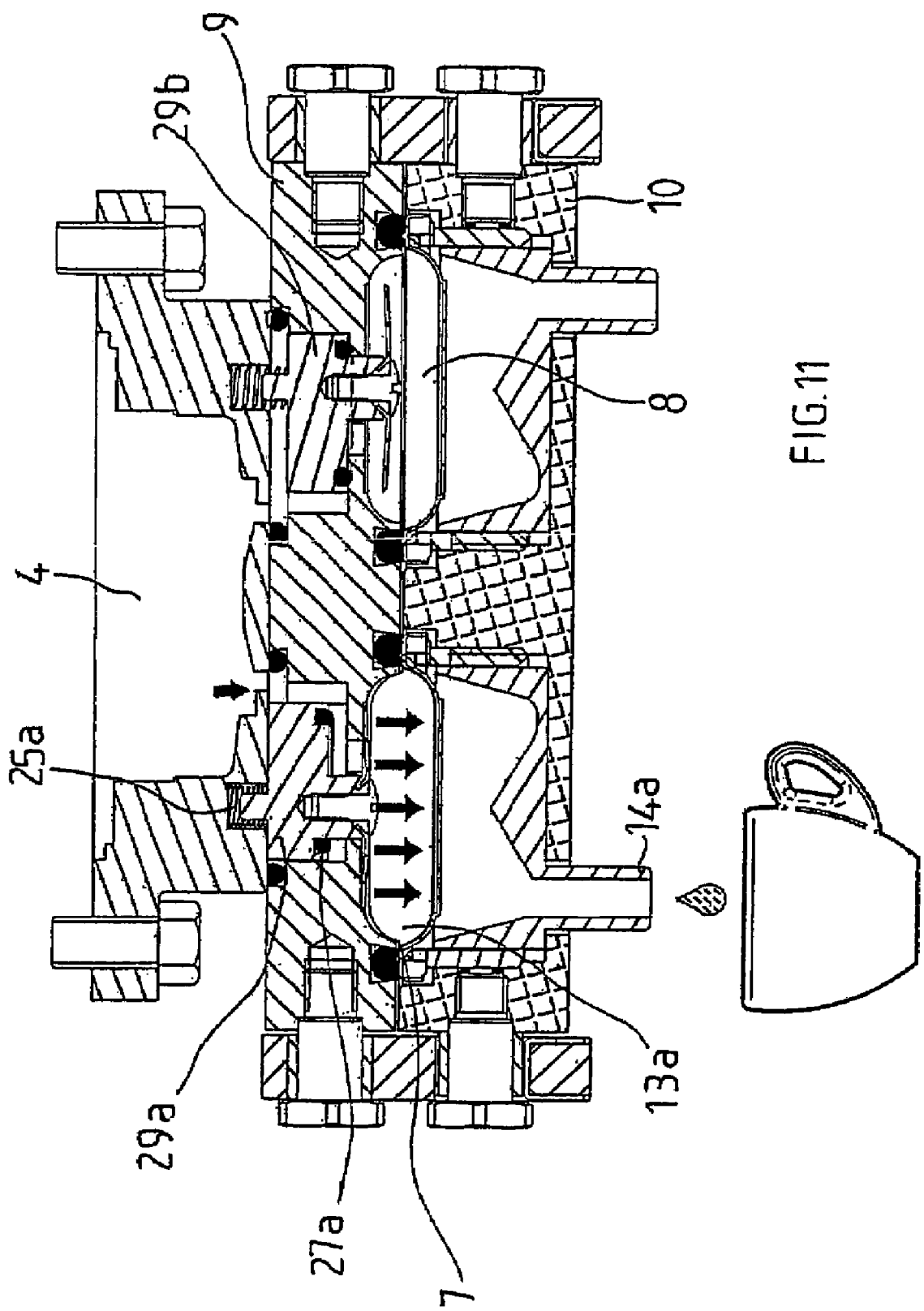

This is the case in particular in FIG. 11 for the brewing chamber 7.

Here, the presence of a substance to be infused 13a has caused the bottom end of the mobile member 29a to bear on the upper surface of the substance to be infused in sachet 13a which has caused the mobile member 29a to retract from the volume of the brewing chamber 7. In doing so, the spring 25a has been constrained. Moreover, the retraction of the mobile member 29a has caused the gasket 27a to detach from the application surface in order to open the hot water inlet into the brewing chamber 7 as represented by the arrows showing the passage of the water.

The hot water coming from the supply inlet 4 at the connection interface 6 passes through the hot water inlet of the brewing chamber 7 to infuse the substance 13a present. The drink produced is then delivered at a flow nozzle 14a extending a funneling part for delivering the drink.

Figure 10:
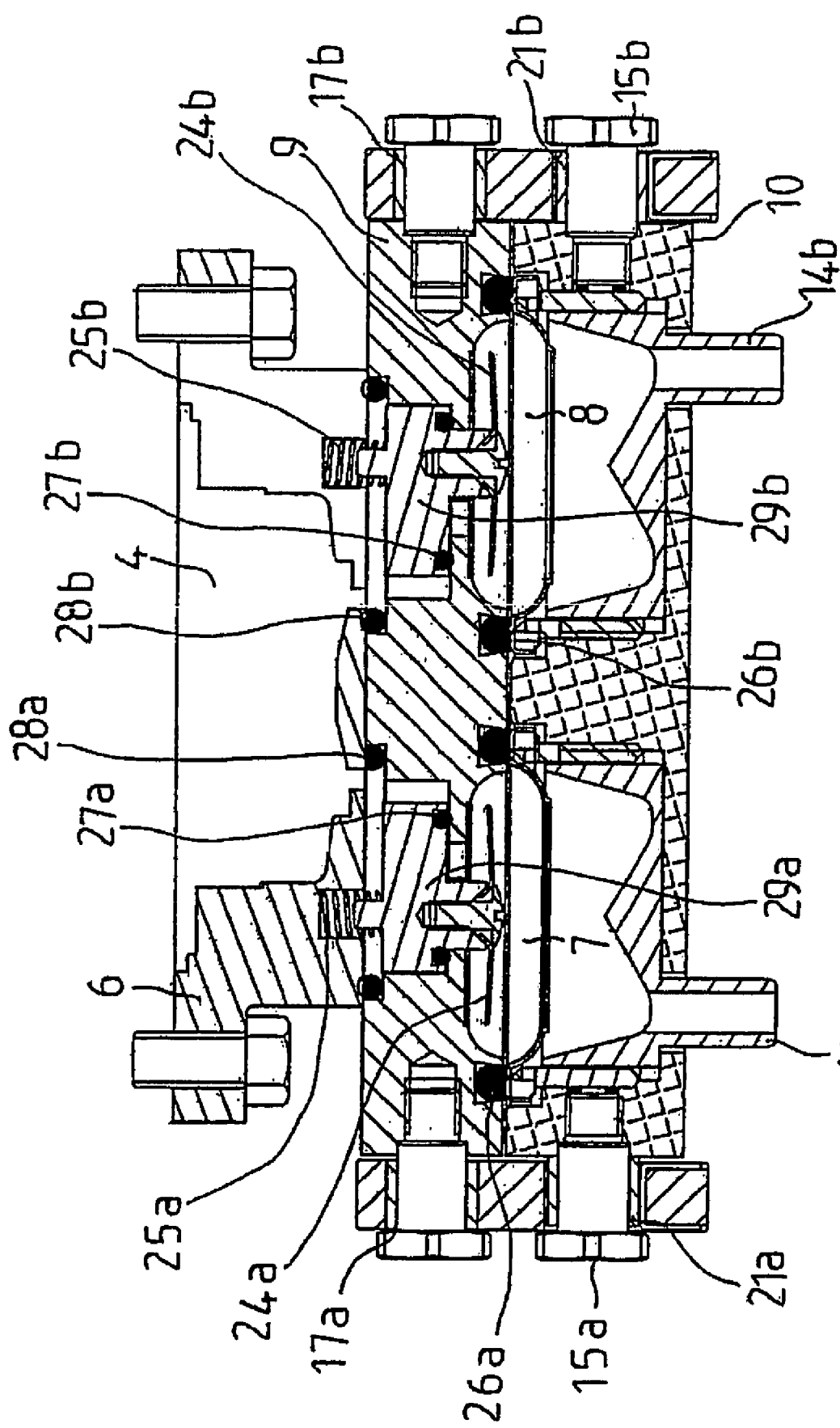
FIGS. 10 to 12 illustrate three cases of operation of the device of the invention with two brewing chambers.
Figure 12:
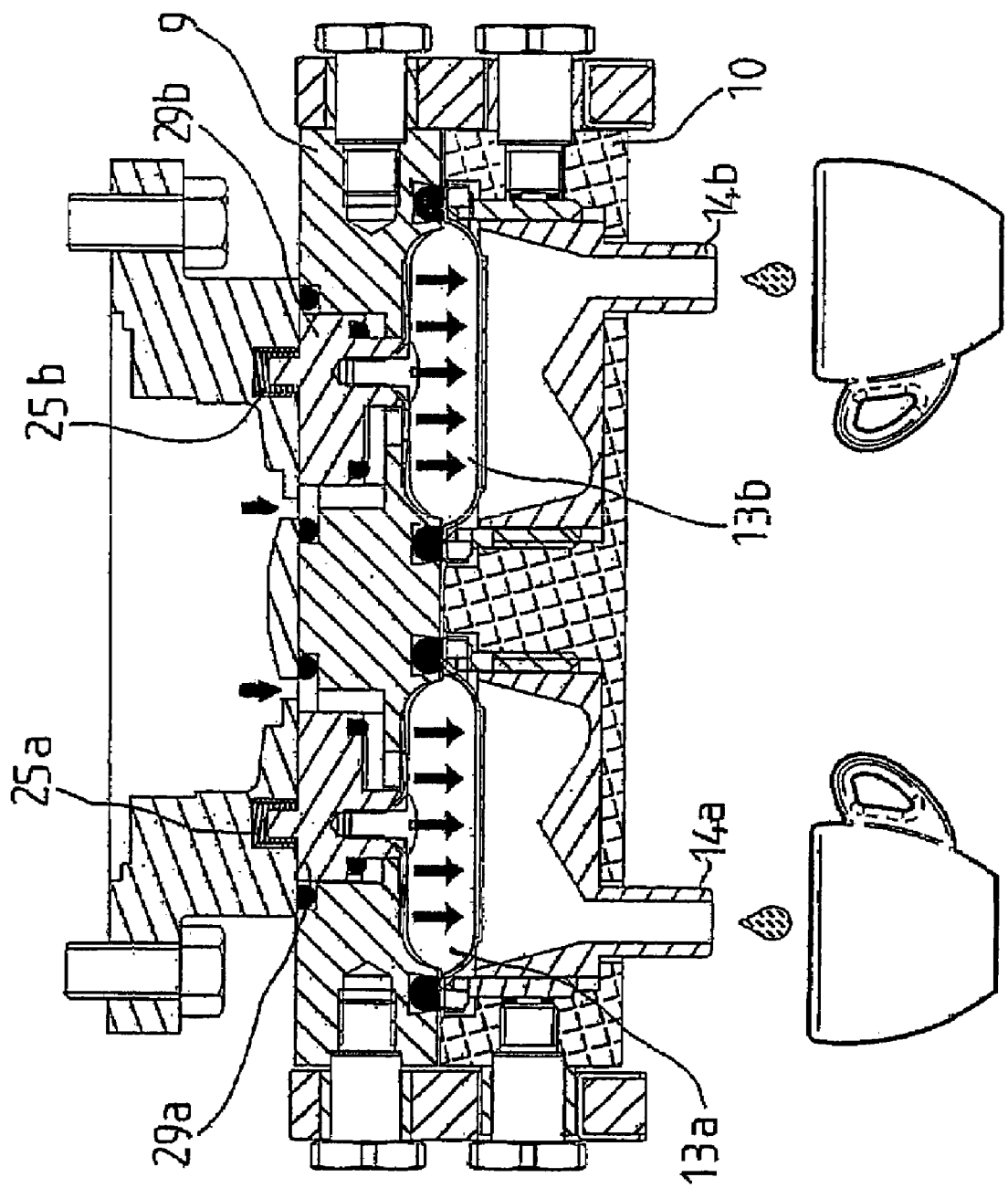

FIGS. 10 to 12 illustrate three operating configurations of two brewing chambers 7, 8 of the device 5.

In the case of FIG. 10, the two brewing chambers 7, 8 are in an inactive position and no substance to be infused in sachet 13a, 13b is present. Consequently, the mobile members 29a, 29b are both deployed in the internal volume of each brewing chamber 7, 8 by closing the hot water inlet.

In the case of FIG. 11, a substance to be infused in sachet 13a is present in the brewing chamber 7. On the other hand, the brewing chamber 8 has remained empty. Consequently, only the mobile member 29a is retracted to open the hot water supply circuit. The mobile member 29b remains in shutoff position of the hot water inlet of the corresponding chamber 8.

There follows the production of a single drink in the brewing chamber 7.

Another alternative is presented in FIG. 12 in which substances to be infused in sachets 13a, 13b are present in each of the brewing chambers 7, 8. Consequently, the two mobile members 29a, 29b are retracted so as to open the hot water inlet of each brewing chamber 7, 8. Consequently, a drink is produced in each brewing chamber.

Figure 13:
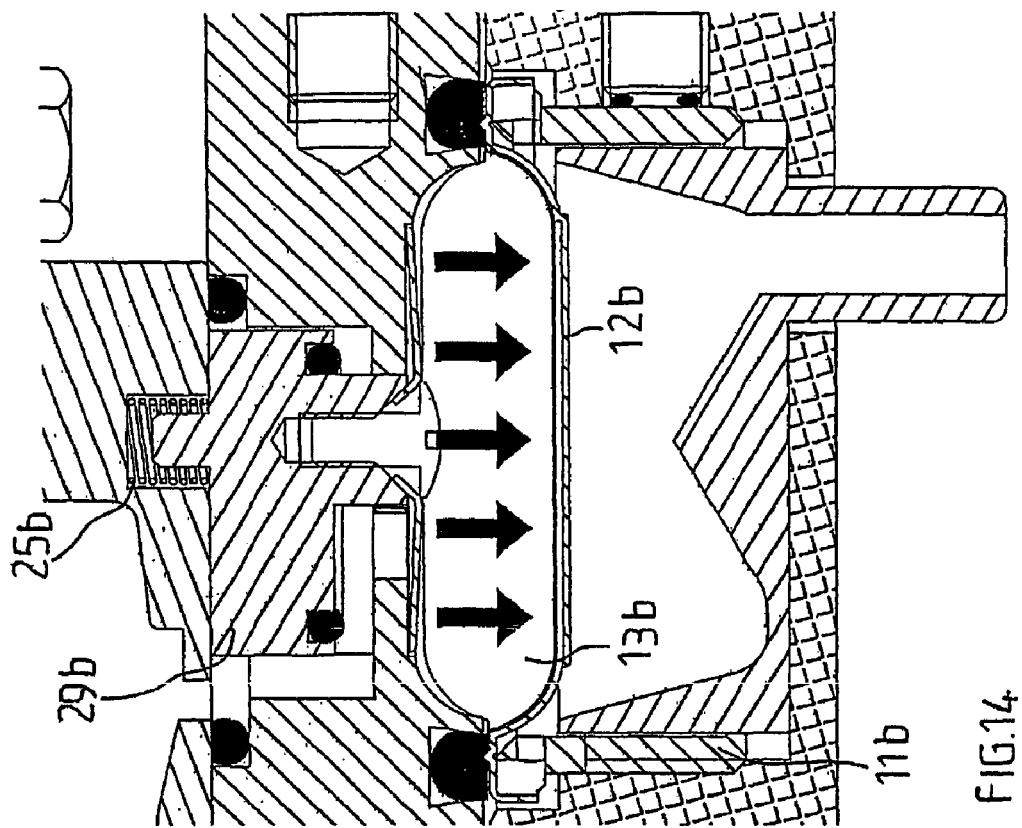
FIG. 13 and FIG. 14 show more precisely the operation of the device of the invention in partial view for one brewing chamber.
Figure 14:
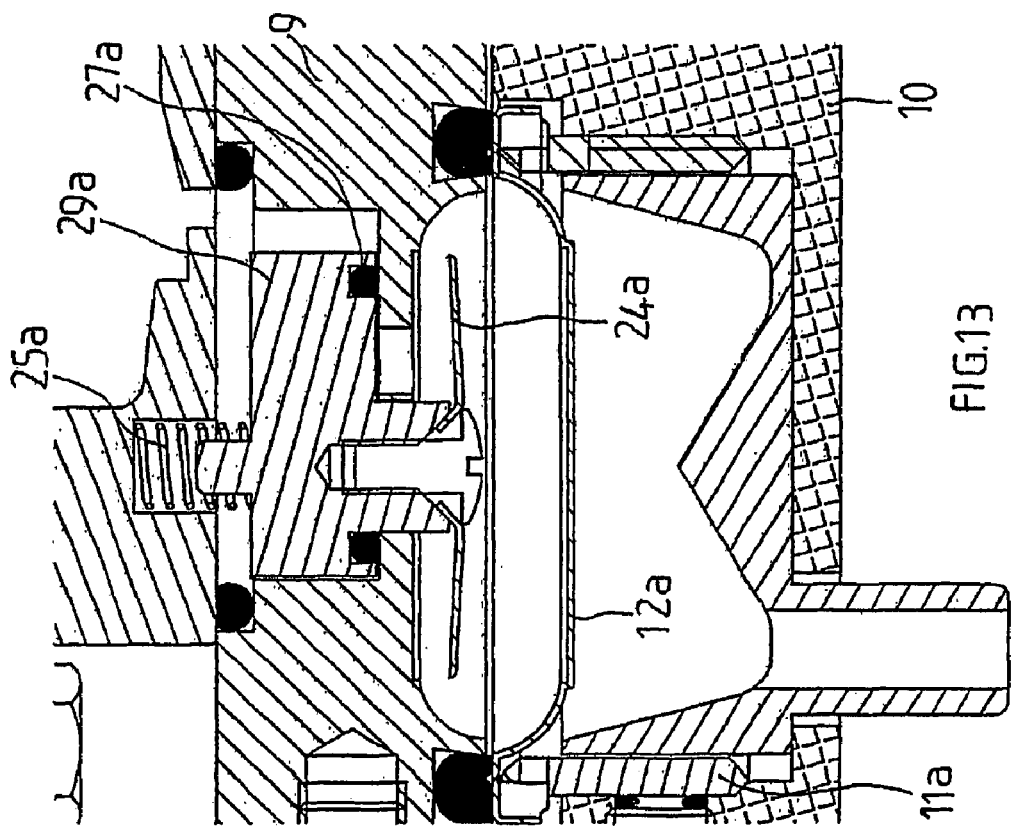

FIGS. 13 and 14 show enlarged partial views of the preferred embodiment of the invention illustrated in FIGS. 9 to 12. In particular, FIG. 13 shows a brewing chamber in closed and non-operating position while FIG. 14 shows a brewing chamber in hot water supply open position for the production of a drink.

Still with reference to the figures, an example is given below of embodiment of the opening and closing of the brewing chambers 7, 8 for the entry or withdrawal of the substance to be infused in sachets 13a, 13b.

Referring particularly to FIGS. 7 to 9, it is observed that the plurality of brewing chambers 7, 8 is formed in part (upper part) in a fixed component 9, and in part (lower part) in a mobile component 10. It is the movement of the mobile component 10 which ensures the opening or closing of a brewing chamber 7, 8.

The part of the brewing chambers 7, 8 present in the fixed component 9 consists of cavities formed in the lower surface of the fixed component 9 and forms the zone of application of the hot water onto the substance to be infused 13a, 13b. It is here that the spout 24a, 24b is received.

The mobile component 10 comprises a plurality of housings 23a, 23b each able to receive in its lower part a flow nozzle 14a, 14b equipped with a funnel and, in the upper part a cup holder 11a, 11b holding a cup 12a, 12b for reception of the substance to be infused in sachet 13a, 13b.

Advantageously, the position of each cup holder 11a, 11b is adjustable in height in particular for fine adjustment of the pressure exerted by the rim of the cup on the rim of the sachet 13a, 13b in closed position with regard to the fixed component 9.

As an example, each holder 11a, 11b may comprise a thread coacting cooperating with an interior tapping of the housing 23a, 23b to form a helicoidal slide able to raise or lower the cup holder 11a, 11b. The final securing in position of the holder 11a, 11b is carried out by means of a pressure screw 15a, 15b. This configuration is shown in detail in FIGS. 13 and 14. As concerns the opening or closing actuation of the mobile component 10, it may be carried out by means of a lever 18 which is actuated manually by the user.

The fixed and mobile components 9, 10 are connected by a swivel pin 19 and are also connected kinematically with two arms 16a, 16b forming one piece with the lever 18.

More particularly, each arm 16a, 16b is mounted swiveling on the fixed component 9 by means of two pins 17a, 17b which are clearly shown in FIG. 9. In relation to the mobile component 10, the arms 16a, 16b each comprise an oblong hole 20a, 20b coacting in translation with a guide finger 21a, 21b mounted on the mobile component 10.

Advantageously, guide finger 21a, 21b has a rectangular section and is mounted swiveling in relation to mobile component 10, for example by means of a screw 15a, 15b.

Advantageously, the mounting screw of each guide finger 21a, 21b is the same screw 15a, 15b as that used to hold in position cup holders 11a, 11b.

Given the friction existing between the wall of oblong hole 20a, 20b and the surface of guide fingers 21a, 21b, it may be useful to place a slip coating 22a, 22b on at least one portion of the wall of oblong holes 20a, 20b.

This will be a coating having a low friction coefficient, and good wear resistance in relation to the materials used to constitute the arms 16a, 16b.

In the open position of brewing chambers 7, 8, lever 18 is raised and allows the entry of the sachets 13a, 13b, as shown in FIGS. 7 and 8. An action by the user on lever 18 to cause it to rotate downwards allows the closure of brewing chambers 7, 8 to reach an operating configuration as presented in FIGS. 10 to 14.

It will be noted that the downward orientation of lever 18 to achieve opening allows easy application of the effort of closure by the user and guarantees correct closure of brewing chambers 7, 8 for perfect leaktightness.

Of course, the various components of device 5 of the invention and in particular connection interface 6, fixed component 9 and mobile component 10 coact together in a leaktight manner by means of seals shown at reference marks 26a, 26b, and 28a, 28b.

It is also obvious that the example illustrated with two brewing chambers 7, 8 could be reproduced with another number of brewing chambers 7, 8, without going beyond the context of this invention.

REFERENCES

1. Coffee machine
2. Front panel
3. Body
4. Supply inlet
5. Device
6. Interface
7. Brewing chamber
8. Brewing chamber
9. Fixed component
10. Mobile component
11a, 11b. Cup holder
12a, 12b. Cups
13a, 13b. Substance to be infused in sachet
14a, 14b. Flow nozzle
15a, 15b. Mounting screw
16a, 16b. Arm
17a, 17b. Pin
18. Lever
19. Swivel pin
20a, 20b. Oblong hole
21a, 21b. Guide finger
22a, 22b. Slip coating
23a, 23b. Housing
24a, 24b. Spout
25a, 25b. Spring
26a, 26b. Seal
27a, 27b. Seal
28a, 28b. Seal
29a, 29b. Mobile member

The invention claimed is:

1. A substance extraction device (5) for producing drinks, comprising:
  a plurality of brewing chambers (7, 8);
  an interface (6) configured to connect to a hot water supply inlet; and means of distributing hot water from said hot water supply inlet between the brewing chambers (7, 8) configured to contain a substance to be infused, wherein the distributing means comprises, for each brewing chamber (7, 8), means for detecting a presence of the substance to be infused, and means for opening the hot water supply inlet into the respective brewing chamber (7, 8) upon detection of the presence of the substance to be infused, wherein said brewing chambers (7, 8) are formed in part in a fixed component (9) and in part in a mobile component (10) between an open position and a closed position of said brewing chambers (7, 8), wherein the fixed component (9) and the mobile component (10) are connected by a swivel pin (19), and wherein the mobile component (10) is actuated by a lever mounted on the fixed component (9) by a pin (17*a*, 17*b*), the lever comprising at least one oblong hole (20*a*, 20*b*) cooperating with a guide finger (21*a*, 21*b*) on the mobile component (10).

2. The device according to claim 1,
further comprising, for each brewing chamber (7, 8), a mobile member (29*a*, 29*b*) configured to occupy, a hot water inlet shutoff position in which one end of the mobile member (29*a*, 29*b*) is deployed inside the respective brewing chamber (7, 8), and a hot water inlet open position in which said one end of mobile member (29*a*, 29*b*) is retracted from the respective brewing chamber (7, 8) by bearing on the substance to be infused.

3. The device according to claim 1,
wherein guide finger (21*a*, 21*b*) has a rectangular section and is mounted to swivel in relation to mobile component (10).

4. The device according to claim 1,
wherein at least one portion of a wall of oblong hole (20*a*, 20*b*) comprises a slip coating (22*a*, 22*b*).

5. The device according to claim 3,
wherein the mobile component (10) comprises, for each brewing chamber (7, 8), a filtering cup (12*a*, 12*b*) supported by a holder (11*a*, 11*b*), each holder (11*a*, 11*b*) being adjustable in height inside a housing (23*a*, 23*b*) formed in the mobile component (10).

6. The device according to claim 5 wherein each holder (11*a*, 11*b*) is secured inside the respective housing (23*a*, 23*b*) by a respective pressure screw (15*a*, 15*b*), wherein each pressure screw (15*a*, 15*b*) is also configured to mount a guide finger (21*a*, 21*b*), and wherein each holder (11*a*, 11*b*) is adjustable in height within the respective housing (23*a*, 23*b*).

7. A machine for producing drinks from a substance to be infused comprising a hot water supply source, comprising:
at least one device according to claim 1.

8. The device according to claim 3,
wherein at least one portion of the wall of oblong hole (20*a*, 20*b*) comprises a slip coating (22*a*, 22*b*).

9. The device according to claim 1,
wherein the mobile component (10) comprises, for each brewing chamber (7, 8), a filtering cup (12*a*, 12*b*) supported by a holder (11*a*, 11*b*), each holder (11*a*, 11*b*) being adjustable in height inside a housing (23*a*, 23*b*) formed in the mobile component (10).

10. A substance extraction device (5) for producing drinks, comprising:
a plurality of brewing chambers (7, 8);
an interface (6) configured to connect to a hot water supply inlet; and
means of distributing hot water from said hot water supply inlet between the brewing chambers (7, 8) configured to contain a substance to be infused, wherein the distributing means comprises, for each brewing chamber (7, 8), means for detecting a presence of the substance to be infused, and means for opening the hot water supply inlet into the respective brewing chamber (7, 8) upon detection of the presence of the substance to be infused, wherein said brewing chambers (7, 8) are formed in part in a fixed component (9) and in part in a mobile component (10) between an open position and a closed position of said brewing chambers (7, 8), and wherein the mobile component (10) comprises, for each brewing chamber (7, 8), a filtering cup (12*a*, 12*b*) supported by a holder (11*a*, 11*b*), each holder (11*a*, 11*b*) being adjustable in height inside a housing (23*a*, 23*b*) formed in the mobile component (10).

* * * * *